United States Patent [19]

Kalvatn

[11] Patent Number: 4,605,334
[45] Date of Patent: Aug. 12, 1986

[54] LINKAGE MECHANISM FOR COUPLING TWO MOVABLE MEMBERS

[75] Inventor: Ivar Kalvatn, Volda, Norway

[73] Assignee: Ari Associates, Inc., San Rafael, Calif.

[21] Appl. No.: 552,666

[22] Filed: Nov. 17, 1983

[30] Foreign Application Priority Data

Nov. 17, 1982 [NO] Norway .................................. 823841

[51] Int. Cl.⁴ ...................... F16M 13/00; F16D 1/00
[52] U.S. Cl. .................................. 403/291; 403/220; 403/203; 248/608; 248/590; 248/372.1; 248/181; 297/303; 297/314; 267/133
[58] Field of Search ................. 403/76, 122, 203, 220, 403/291; 248/371, 372.1, 181, 184, 608, 590; 297/314, 311, 301, 300, 264, 265, 303; 267/131, 133, 73; 74/5 F

[56] References Cited

U.S. PATENT DOCUMENTS

| | | | |
|---|---|---|---|
| 929,272 | 7/1909 | Baron | 297/314 |
| 2,718,257 | 9/1955 | Lie | 248/608 |
| 2,877,830 | 3/1959 | Smith | 248/371 |
| 3,162,420 | 12/1964 | Lie | 248/608 |
| 3,512,419 | 5/1970 | Stiles | 74/5 F |
| 3,544,159 | 12/1970 | Andersson | 297/303 |
| 3,552,796 | 1/1971 | Williams | 248/608 |
| 4,236,752 | 12/1980 | Mizelle | 297/303 |
| 4,431,157 | 2/1984 | Arild | 248/608 |
| 4,438,978 | 3/1984 | Arild | 248/608 |
| 4,498,656 | 2/1985 | Arild | 248/608 |

FOREIGN PATENT DOCUMENTS 8201760  3/1982  PCT Int'l Appl. ................ 248/608

Primary Examiner—Cornelius J. Husar
Assistant Examiner—Todd G. Williams
Attorney, Agent, or Firm—Limbach, Limbach & Sutton

[57] ABSTRACT

A mechanism is disclosed to provide pivotal motion between two movable members. The mechanism includes a hemispherical yoke connected to one of the movable members. A center support is connected to the remaining movable member and is nested within the yoke and spaced apart therefrom. A set of four radially projecting torsion bars are connected to the yoke and center support. The torsion bars are substantially coplanar and define a cross-shaped configuration in plan. Four braces are provided to interconnect adjacent torsion bars. Preferably, each of the torsion bars is surrounded by a tubular segment which is affixed to the radially outer end of the torsion bars. Preferably the radially inner portion of the torsion bar is supported by a rotatable bearing. The subject mechanism is low in profile, easy to mount and dismount, and provides a degree of elasticity in the vertical axis.

10 Claims, 2 Drawing Figures

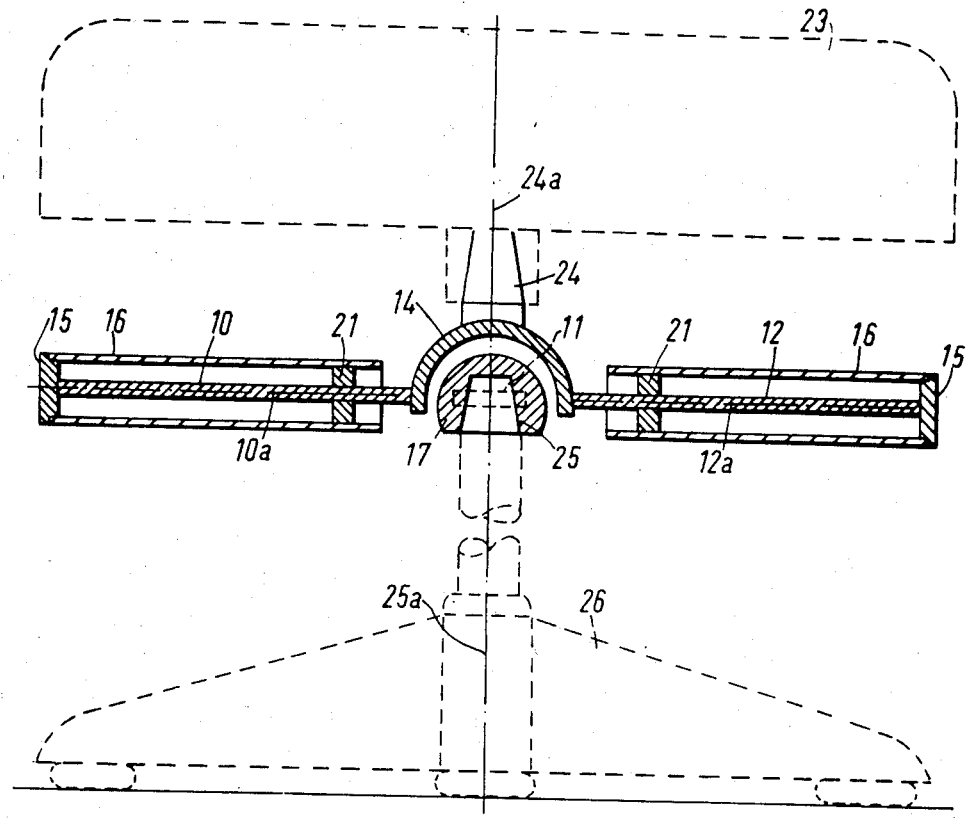
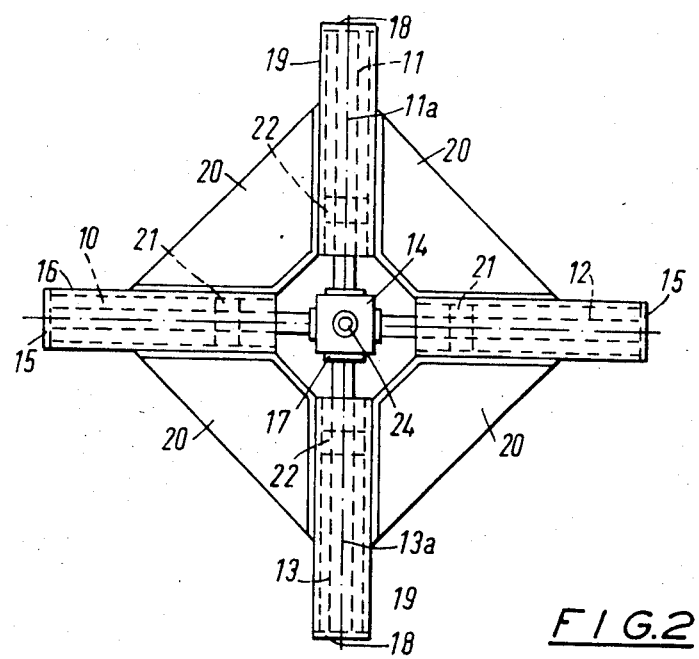

LINKAGE MECHANISM FOR COUPLING TWO MOVABLE MEMBERS

DESCRIPTION

1. Technical Field

The present invention relates to a mechanism for coupling together a pair of movable components, said components being spaced a certain distance apart along a first axis, where said components may move in an elastic fashion relative to each other, to a limited extent by means of torsion bars, about a second axis and thence a third axis, which axes cross each other at right angles and which, in addition, cross the first axis.

2. Background of the Invention

A mechanism of this type is shown in applicant's prior U.S. Pat. No. 4,185,803. The latter device comprises two concentric rings which are connected and placed in relation to each other by means of torsion bars connected to each of them. The device occupies relatively large amounts of space, in that the first ring, with its respective torsion bar, is placed beneath the second ring with its respective torsion bar. In addition, in the latter device, the connection to the movable members must be made via the rings such that mounting can be difficult.

With the present invention the object is to provide a solution to the aforesaid prior art, generally requiring less space as well as being simpler to produce, mount and demount.

According to the invention, another object is to obtain limited elastic yielding motion of the parts in addition to the torsionally restrained motion. In other words, the aim is to, in addition to the conical motion of the movable members relative to each other about the said second and third axes, obtain a springing back and forth motion of the parts relative to each other.

SUMMARY OF THE INVENTION

In accordance with these and many other objects, the subject invention provides for a pivotal adjustment mechanism for connection between a pair of mutually movable members. The adjustment mechanism includes a generally hemispherical or U-shaped yoke connected to one of the members. A center support is connected to the remaining movable member. The center support is nested within and spaced apart from the yoke. A first pair of torsion bars projects radially outwardly from the sides of the yoke. A second pair of torsion bars projects radially outwardly from the center support. The first and second pair of torsion bars are substantially coplanar and define a cross-shaped configuration in plan. A set of four braces are provided which interconnect adjacent torsion bars. The braces are provided to transmit the torsional forces between the torsion bars.

A means is provided to facilitate the connection between the torsion bars and the braces. In the preferred embodiment, the connection means includes four tubular segments, each mounted about one of the torsion bars. The radially outer portion of each torsion bar is connected to the outer end of the associated tubular segment. Preferably, the radially inner portion of the tubular segment is rotatably mounted, via a bearing means, to the radially inner portion of the torsion bar.

As will be seen below, in the subject mechanism, the torsion bars and the braces all lie in a single plane. By this arrangement, the entire package can be reduced in height to facilitate use in a variety of situations. In addition, the device can be mounted along its center axis in a simple manner. Preferably, the center support members include both a conical projection and a conical recess to facilitate this mounting. Finally, since the center members are not interconnected, a degree of elastic damping is achieved in addition to the torsional restraint.

Other features will become apparent in accordance to the invention by the following description referring to the attached drawing wherein:

BRIEF DESCRIPTION OF THE DRAWINGS

FIG. 1 shows a cross section of the device in accordance to the invention.

FIG. 2 is a top plan view of the device as shown in FIG. 1.

DETAILED DESCRIPTION OF THE PREFERRED EMBODIMENT

In FIGS. 1 and 2 there is shown four torsion bars 10, 11, 12, 13. A first pair of opposed torsion bars 10, 12 has the inner ends fastened to a common first attachment means 14, which is in the form of a semicircular metal bracket or yoke. The radially outer ends of the torsion bars are fastened to a second attachment means 15 in the form of metal disk inserted into tubular segments 16 shown in a shaded section in FIG. 1.

A second pair of opposing torsion bars 11, 13 has its inner ends fastened to a center support member 17, which is in the form of a hemispherical metal bracket nested in and spaced apart from the first attachment means 14. The radially outer ends of the second pair of torsion bars are fastened to the fourth attachment means 18 in the form of a metal disk inserted into tubular segments 19. The metal disks 15 and 18 are fixed to the tubular segments.

In the shown embodiment, tubular structures 16 and 19 are connected in a cross-shaped configuration in plan. In addition, the torsion bars and tubular segments are substantially coplanar.

In accordance with the subject invention, braces or flange plates 20 are provided, interconnecting adjacent tubular segments to define a stiffened structure. The braces may be connected directly to the torsion bars, but the use of the tubular segments is preferred to simplify fabrication. In addition, the torsion bars may be arranged to lie in parallel planes, however the coplanar structure is preferred for compactness.

The radially inner portions of torsion bars 10, 12 are supported within the associated tubular structure by a disk-shaped bearing means 21, which is free to rotate on the inner surface of the respective tubular structure. Similarly, the radially inner portions of torsion bars 11, 13, are fastened to a like disk-shaped bearing means 22 which is free to rotate in a like manner inside tubular structure 19.

The device shown in the drawings illustrates the use of said device in connection with a chair or stool, where the seat 23 of the chair is fastened to the yoke 14 of the device via a conical projection or tapered plug 24, which is inserted into a corresponding tapered socket protruding from the bottom side of the seat 23. The center support 17 is provided with a conical recess or tapered socket 25 which mates with a corresponding tapered plug attached to chair base. Where no torsional restraint is desired, the tapered projection of the seat base 26 can be inserted into the mating recess of one chair. If flexing is desired, the subject mechanism can easily be interposed between the movable members as described above. As can be appreciated, the low profile of the subject mechanism adds little overall height to the chair.

The mechanism of the subject invention also provides for a degree of elastic damping. When the chair is in the upright position, the seat 23 can be moved along the vertical axis relative to the base. With this movement, the torsion bars will tend to flex about the fulcrum provided by bearings 21 and 22 respectively. The amount of bending or cushioning can be determined by the distance between the center connection and the bearings. Some amount of flexing will also occur along the torsion bars radially outward of the bearings.

This cushioning effect is not diminished if the seat is tilted directly along the axis of either pair of torsion bars. However, if both sets of torsion bars are flexed, the tension created in the torsion bars will function to diminish the cushioning effect. Fortunately, the damping effect is most desirable when someone sits down or gets up from a chair. In this situation, the torsion bars are not flexed and maximum damping is achieved. The damping effect can be modified by altering the angle of the connection between the mechanism and the chair to, in effect, preload the torsion bars.

The invention is described as it could be used to connect a stool seat with a chair base. In addition, the mechanism can be used with corresponding advantages in connection with apparatus or machinery where two apparatus or machine parts can be moved in a cushioning or springing manner to and fro along a first axis 24a, 25a, while rotating relative to each other about a second axis 10a, 12a and/or a third axis 11a, 13a which intersect the said first axis 24a, 25a. The device in accordance with the invention may be used between two such parts which, for example, can pull apart with a certain force or push together with a certain force along said first axis 24a, 25a.

In the shown embodiment the seat 23 is fastened to the first centrally yoke 14, while the chair base 26 is fastened to the center support 17. Alternatively, the seat can be fastened to the second radially outer attachment means 15, which is rotatably supported to the respective tubular structure 16, while the chair base may be fastened to the fourth outer radially located attachment means 18, which is rotatably supported in the corresponding tubular structure 19. In the latter case the yoke 14 and central support member 17 will be fixedly connected to each other.

In summary, there has been provided a new and improved pivotal adjustment mechanism for connection between a pair of mutually movable members. A generally hemispherical or U-shaped yoke 14 is connected to one of the movable members. A center support member 17 is connected to the remaining movable member and is nested within and spaced apart from the center support. A first pair of torsion bars 10, 12 are connected to and project radially outward from the yoke. A second pair of torsion bars 11 and 13 are connected to and project radially outwardly from the center support. The torsion bars are coplanar and disposed in a cross-shaped configuration in plan. Preferably, four tubular segments 16, 19 are mounted about the torsion bars with the tubular segments being connected to the associated torsion bar adjacent the radially outer end of the torsion bar. The radially inner ends of the tubular segments are supported by a rotatable bearing means 21, 22. Planar braces 20 are provided to interconnect adjacent torsion bars through the tubular segments. The subject mechanism provides a low profile which takes up little vertical space. In addition, the center yoke and support member provide easy mounting and dismounting of the mechanism. Finally, because the center members are not connected, a degree of damping is achieved along the vertical axis.

While the subject invention has been described with reference to a preferred embodiment, other changes and modifications could be made therein, by one skilled in the art, without varying from the scope and spirit of the subject invention as defined by the appended claims.

I claim:

1. A linkage mechanism for connection between a pair of mutually movable members to provide torsionally restrained conical motion therebetween comprising:
   a generally hemispherical yoke connected to one of the movable members;
   a center support member connected to the remaining movable member, said center support member being nested within and spaced apart from said yoke;
   a first pair of torsion bars projecting radially outwardly from and connected to the sides of said yoke;
   a second pair of torsion bars projecting radially outwardly from and connected to said center support, said first and second pairs of torsion bars being substantially coplanar and defining a cross-shaped configuration in plan; and
   brace means interconnecting adjacent torsion bars for transmitting torsional forces therebetween with said torsion bars functioning to restrain the relative motion between the movable members.

2. A linkage mechanism as recited in claim 1 further including a means to facilitate the connection between the torsion bars and said brace means.

3. A linkage mechanism as recited in claim 2 wherein said connection means includes four tubular segments, each tubular segment being mounted about and connected to one of said torsion bars, with said brace means being connected to said tubular segments.

4. A linkage mechanism as recited in claim 3 wherein the radially outer end of each torsion bar is connected to the associated tubular segment.

5. A linkage mechanism as recited in claim 4 wherein the radially inner portion of each tubular segment is rotatably supported about the associated torsion bar.

6. A linkage mechanism as recited in claim 5 wherein said rotatable support is defined by a bearing means.

7. A linkage mechanism as recited in claim 1 wherein said torsion bars are generally planar in configuration.

8. A linkage mechanism as recited in claim 1 wherein said brace means is defined by four planar brace members mounted substantially coplanar with said torsion bars.

9. A linkage mechanism as recited in claim 1 wherein said yoke is provided with an upwardly projecting conical member for connection to said movable member.

10. A linkage mechanism as recited in claim 1 wherein said center support member is provided with a conical recess for connection to one of said movable members.

* * * * *